US007492964B2

(12) United States Patent
Takeda et al.

(10) Patent No.: US 7,492,964 B2
(45) Date of Patent: *Feb. 17, 2009

(54) SYSTEM AND METHOD FOR DETECTING OBSTACLE

(75) Inventors: Nobuyuki Takeda, Tokyo (JP); Hiroshi Hattori, Tokyo (JP); Kazunori Onoguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 58 days.

This patent is subject to a terminal disclaimer.

(21) Appl. No.: 11/750,548

(22) Filed: May 18, 2007

(65) Prior Publication Data
US 2007/0217657 A1    Sep. 20, 2007

Related U.S. Application Data

(60) Division of application No. 11/223,977, filed on Sep. 13, 2005, now Pat. No. 7,242,817, which is a continuation of application No. 10/151,804, filed on May 22, 2002, now Pat. No. 6,990,253.

(30) Foreign Application Priority Data
May 23, 2001    (JP)    ............... 2001-154569

(51) Int. Cl.
*G06K 9/32*    (2006.01)
(52) U.S. Cl. ............... 382/276; 382/284; 382/294; 358/450
(58) Field of Classification Search ................ 382/282, 382/284, 294; 358/450, 452, 453
See application file for complete search history.

(56) References Cited

U.S. PATENT DOCUMENTS
4,211,921 A    7/1980    Kanetou et al.

(Continued)

OTHER PUBLICATIONS

D. Koller, et al. "Using Binocular Stereopsis for Vision-based Vehicle Control", in Proc of Intelligent Vehicles Symposium, 1994 pp. 237-242.

*Primary Examiner*—Yosef Kassa
(74) *Attorney, Agent, or Firm*—Oblon, Spivak, McClelland, Maier & Neustadt, P.C.

(57) ABSTRACT

A computer readable storage medium storing instructions of a computer program which when executed by a computer results in performance of steps including inputting a first image and a second image from two cameras, respectively, transforming the first image to a transformed image, obtaining a degree of similarity D indicating similarity between an image in a processing region established in the second image and an image in a corresponding processing region established in the first image, obtaining a degree of similarity P indicating a similarity between an image in the processing region established in the second image and an image in a corresponding processing region established in the transformed image, detecting the obstacle based on of the degree of similarity D and the degree of similarity P on a reference plane region, detecting the obstacle on a basis of the degree of similarity D and the degree of similarity P on a reference plane region, obtaining a difference K between the degree of similarity D and the degree of similarity P both obtained as being on the reference plane region, judging that the obstacle is at a position where the difference K is large, and determining a width and a height of the processing region on the basis of a position in the vertical direction on the second image.

3 Claims, 8 Drawing Sheets

U.S. PATENT DOCUMENTS

| | | |
|---|---|---|
| 5,073,819 A | 12/1991 | Gates et al. |
| 5,109,425 A * | 4/1992 | Lawton ................ 382/107 |
| 5,227,985 A * | 7/1993 | DeMenthon ............ 702/153 |
| 5,331,413 A | 7/1994 | Diner |
| 5,530,420 A | 6/1996 | Tsuchiya et al. |
| 5,623,244 A | 4/1997 | Cooper |
| 5,638,420 A | 6/1997 | Armistead |
| 5,694,483 A | 12/1997 | Onoguchi |
| 5,831,669 A | 11/1998 | Adrain |
| 5,943,783 A * | 8/1999 | Jackson ................. 33/288 |
| 6,205,242 B1 | 3/2001 | Onoguchi |
| 6,268,803 B1 * | 7/2001 | Gunderson et al. ....... 340/903 |
| 6,448,562 B1 * | 9/2002 | Seidler et al. ............ 250/372 |
| 6,476,731 B1 | 11/2002 | Miki et al. |
| 6,594,600 B1 | 7/2003 | Arnoul et al. |

\* cited by examiner

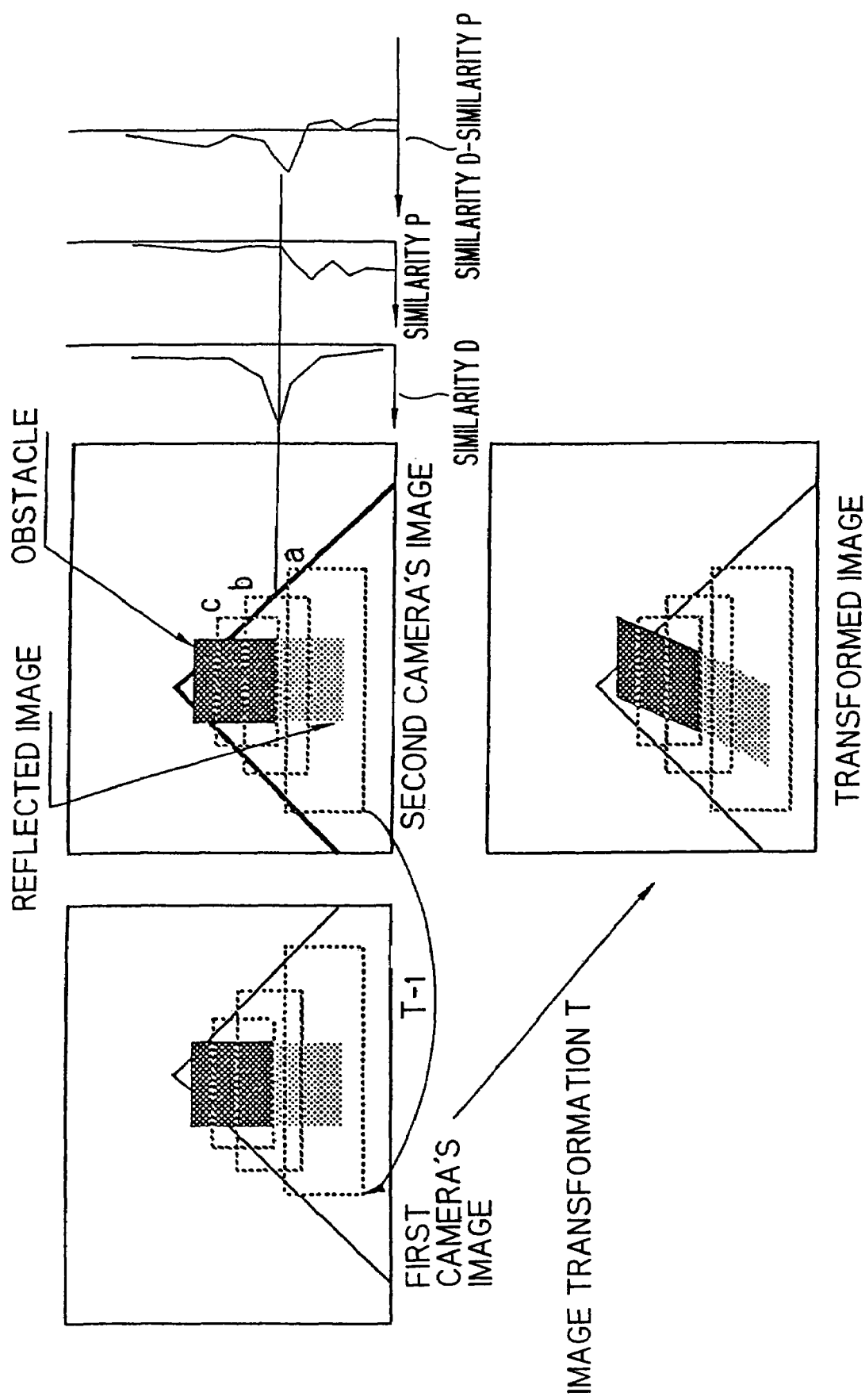

SYSTEM AND METHOD FOR DETECTING OBSTACLE

CROSS-REFERENCE TO RELATED APPLICATIONS

This application is a division of and claims the benefit of priority under 35 U.S.C. §120 from U.S. Ser. No. 11/223,977, filed Sep. 13, 2005, which is a continuation of U.S. Pat. No. 6,990,253, issued Jan. 24, 2006, and claims the benefit of priority under 35 U.S.C. §119 from Japanese Patent Application No. 2001-154569, filed May 23, 2001, the entire contents of each application are incorporated herein by reference.

BACKGROUND OF THE INVENTION

The present invention mainly relates to a system and a method for detecting an obstacle on a road such as a vehicle going ahead, a parking vehicle, or a pedestrian by vehicle-mounted camera system for realization of supporting safety driving of a vehicle or automatic running of a vehicle.

Technologies for detecting an obstacle may be roughly classified into that of utilizing a laser beam or an ultrasonic wave, and that of utilizing a TV camera. Utilization of a laser beam is expensive. Utilization of an ultrasonic wave causes a problem in detection accuracy of an obstacle because of a low resolution of the ultrasonic wave. In addition, with an active sensor utilizing a laser beam or an ultrasonic wave, recognition of a lane is impossible only by the sensor itself.

Compared with this, a TV camera is relatively inexpensive and also is suitable for detecting an obstacle in resolution, measuring accuracy, and a measurable range. A TV camera utilizing system may be classified into that of utilizing a single TV camera and that of utilizing a plurality of TV cameras (stereo camera).

The system utilizing a single TV camera uses a method in which a road region and an obstacle region is separated on the basis of key information about brightness, color, or textures, which are obtained from an image picked up by the camera.

For example, a region with medium brightness with low chroma, i.e. a gray region, is extracted to obtain a road region, or a region with a few textures is obtained to provide the rest as an obstacle region. There are, however, many obstacles having similar brightness, color, and textures to those of the road to make it difficult to use the method for distinguishing the obstacle region and the road region.

Compared with this, in a method used in the system utilizing a plurality of cameras an obstacle is detected on the basis of three-dimensional information as a key. The method is generally called as "stereopsis".

The stereoscopic viewing is a method in which two cameras, for example, are disposed on the right and left, respectively, a relationship between images by the right and left cameras is obtained about the same point in three-dimensional space, and thus, a three-dimensional position of the point is obtained by adopting a procedure of triangulation. The position and an attitude of each camera about the road that are obtained beforehand allows a height from the road plane of any given point in the image to be obtained by the stereoscopic viewing. This can distinguish the obstacle region from the road region by knowing as to whether a point is positioned at some height or not. The stereoscopic viewing makes it possible to avoid a problem caused in the case where a single camera is used.

In a normal stereoscopic viewing, there is a problem in that a process of carrying out matching is necessary. The stereoscopic viewing is in general a technology of obtaining a three-dimensional position of any given point given in an image about a coordinate system fixed in the stereo camera (hereinafter referred to as a stereo camera coordinate system). The matching means a searching calculation necessitated when making a point being the same in the space into correspondence between right and left images with a problem of extremely high in calculation cost. Thus, the matching is a factor of preventing the stereoscopic viewing from being brought into realization.

In this respect, each of procedures disclosed in Japanese Patent Laid-Open No. 2001-76128 and Japanese Patent Laid-Open No. 2000-293693 provides a method of detecting an obstacle on a road (hereinafter referred to as a related procedure) with a very high speed without carrying out the matching processing even though a stereo camera is used.

In the above related procedures, a road surface is supposed to be a flat plane, an image transform T is obtained in which a picture element point (pixel) of a road surface region in one camera image (a first camera's image) is made into correspondence with a corresponding pixel of a road surface region in the other camera image (a second camera's image) on the basis of a geometrical relation between the stereo camera and the road surface, and an obstacle is detected from a difference between a transformed image by the image transform T (transformed image) and the second camera's image. That is, any given picture element on the road surface region displayed in the first camera's image is correctly transformed to a corresponding picture element in the second camera's image by the image transform T. Contrary to this, a picture element on a region of an object with any given height (i.e. an obstacle) is not correctly transformed into a corresponding picture element. Therefore, an obstacle is detected at a high speed by obtaining a difference between a position of the pixel elements in the second camera's image and that in the transformed image.

However, in the case where reflected images of an obstacle, structures around the road, and scenery of environment are produced on the road surface as observed in a wet road surface in rainy weather, it was impossible by the related procedure which was for detecting an object with a height other than zero to correctly detect an obstacle.

This is because the reflected image from the road surface can be virtually regarded as an object with a negative height, and no virtual image can be correctly transformed to a corresponding picture element by the above image transform.

Accordingly, the present invention was made in view of the above situation with an object of providing a system and a method of detecting an obstacle which has a feature of necessitating no stereoscopic correspondence like in the related procedure and is still capable of correctly detecting the obstacle even in the case where a reflected image from a road surface is produced.

SUMMARY OF THE INVENTION

The first aspect of the invention is an obstacle detecting system detecting an obstacle by using two cameras, the obstacle being on a reference plane in a field of view common to the two cameras, the system comprising: an image capture section for inputting a first image and a second image from the two cameras, respectively; an image transforming section for transforming the first image to a transformed image on the basis of image transform which is introduced from a geometrical relationship between the reference plane and the two cameras for transforming any given pixel in a reference plane region in the first image to a corresponding pixel in the second image; a similarity calculating section for obtaining: a degree of similarity D indicating similarity between an image in a processing region established in the second image and an image in a corresponding processing region established in the first image and being a function of position in the vertical direction of the image, on an assumption that any given image line in a specified region in the second image is a contact line of the obstacle with the reference plane, the processing region being established for an inter-image arithmetic operation between the first image and the second image, and a plurality of the processing regions being established with the image line being shifted in the vertical direction, and a degree of similarity P indicating similarity between an image in the processing region established in the second image and an image in a corresponding processing region established in the transformed image and being a function of position in the vertical direction of the image, the processing region being established for an inter-image arithmetic operation between the second image and the transformed image, and a plurality of the processing regions being established with the image line being shifted in the vertical direction; and an obstacle judging section for detecting the obstacle on the basis of the degree of similarity D and the degree of similarity P on a reference plane region obtained by the similarity calculating section.

The obstacle judging section may obtain a difference K between the degree of similarity D and the degree of similarity P both obtained as being on the reference plane region by the similarity calculating section, and judges that the obstacle is at a position where the difference K is large.

The similarity calculating section may determine a width and a height of the processing region on the basis of a position in the vertical direction on the second image.

The obstacle judging section may also judge that there is no obstacle when there is no difference K of degree of similarity equal to or more than a threshold value set beforehand about the vertical directions of all of the images, and detect that there is the obstacle when there is the difference K of degree of similarity equal to or more than the threshold value in the vertical direction of the image.

The similarity calculating section may also prepare n ($1<i \leq n$) kinds of different functions which determine the width and the height of each of the processing regions for obtaining the degree of similarity $D_i$ and the degree of similarity $P_i$ in each of the processing regions determined by each of the functions; and the obstacle judging section may then detect a position of the obstacle from each of the degree of similarity $D_i$ and the degree of similarity $P_i$ in each of the processing regions produced by each of the functions, and judge each of all or a part of the detected positions of the obstacle, or a position of the detected obstacle being the closest to the two cameras as the position of the obstacle.

The obstacle judging section may: further carry out threshold value processing of the difference K with a threshold value equal to or more than zero, in which the difference K is given as K(y) as a function of y the direction of which is taken as the vertical direction of the image and a result of the threshold value processing of K(y) is taken as $K_{th}(y)$; judge that there is none of the obstacle in a case when $K_{th}(y)$ satisfies $$\sum_y K_{th}(y) = 0;$$

and judge that $Y_0$ that makes $$\left| \alpha \sum_y K_{th}(y) - \sum_y^{y_0} K_{th}(y) \right|$$

the minimum is the position of the obstacle in the cases other than the above, where a is any one of constants from 0 to 1.

In the obstacle detecting system, three or more cameras may be provided, of which any given two cameras detect the obstacle, and either a result of detection of a plurality of the obstacles or a position of an obstacle detected as being the closest to the cameras is selected and outputted.

The second aspect of the invention is a method of detecting an obstacle by using two cameras, the obstacle being on a reference plane in a field of view common to the two cameras, the method comprising: the image inputting step of inputting a first image and a second image from the two cameras, respectively; the image transforming step of transforming the first image to a transformed image on the basis of image transform which is introduced from a geometrical relationship between the reference plane and the two cameras for transforming any given pixel in a reference plane region in the first image to a corresponding pixel in the second image; the similarity calculating step of obtaining: a degree of similarity D indicating similarity between an image in a processing region established in the second image and an image in a corresponding processing region established in the first image and being a function of position in the vertical direction of the image, on an assumption that any given image line in a specified region in the second image is a contact line of the obstacle with the reference plane, the processing region being established for an inter-image arithmetic operation between the first image and the second image, and a plurality of the processing regions being established with the image line being shifted in the vertical direction, and a degree of similarity P indicating similarity between an image in the processing region established in the second image and an image in a corresponding processing region established in the transformed image and being a function of position in the vertical direction of the image, the processing region being established for an inter-image arithmetic operation between the second image and the transformed image, and a plurality of the processing regions being established with the image line being shifted in the vertical direction; and the obstacle judging step of detecting the obstacle on the basis of the degree of similarity D and the degree of similarity P on a reference plane region obtained by the similarity calculating step.

The third aspect of the invention is a program realizing an obstacle detection method by a computer, the method using two cameras for detecting the obstacle on a reference plane in a field of view common to the two cameras, wherein by the computer, the program realizes: an image inputting function for inputting a first image and a second image from the two cameras, respectively; an image transforming function for transforming the first image to a transformed image on the basis of image transform which is introduced from a geometrical relationship between the reference plane and the two cameras for transforming any given pixel in a reference plane region in the first image to a corresponding pixel in the second image; a similarity calculating function for obtaining: a degree of similarity D indicating similarity between an image in a processing region established in the second image and an image in a corresponding processing region established in the first image and being a function of position in the vertical direction of the image, on an assumption that any given image line in a specified region in the second image is a contact line of the obstacle with the reference plane, the processing region being established for an inter-image arithmetic operation between the first image and the second image, and a plurality of the processing regions being established with the image line being shifted in the vertical direction, and a degree of similarity P indicating similarity between an image in the processing region established in the second image and an image in a corresponding processing region established in the transformed image and being a function of position in the vertical direction of the image, the processing region being established for an inter-image arithmetic operation between the second image and the transformed image, and a plurality of the processing regions being established with the image line being shifted in the vertical direction; and an obstacle judging function for detecting the obstacle on the basis of the degree of similarity D and the degree of similarity P on a reference plane region obtained by the similarity calculating function.

BRIEF DESCRIPTION OF THE DRAWINGS

FIG. 9 is an explanatory diagram showing each kind of image under a fourth road surface condition under which a reflected image from a road surface is produced.

DETAILED DESCRIPTION OF THE INVENTION

In the following, an example of the invention will be explained according to the drawings.

In the example, a situation is assumed under which a vehicle mounting a stereo camera including right and left cameras (the vehicle mounting the stereo camera is to be referred to as a subject vehicle) is running on a road surface (a reference plane) to detect obstacles such as vehicles going ahead and pedestrians.

Figure 1:
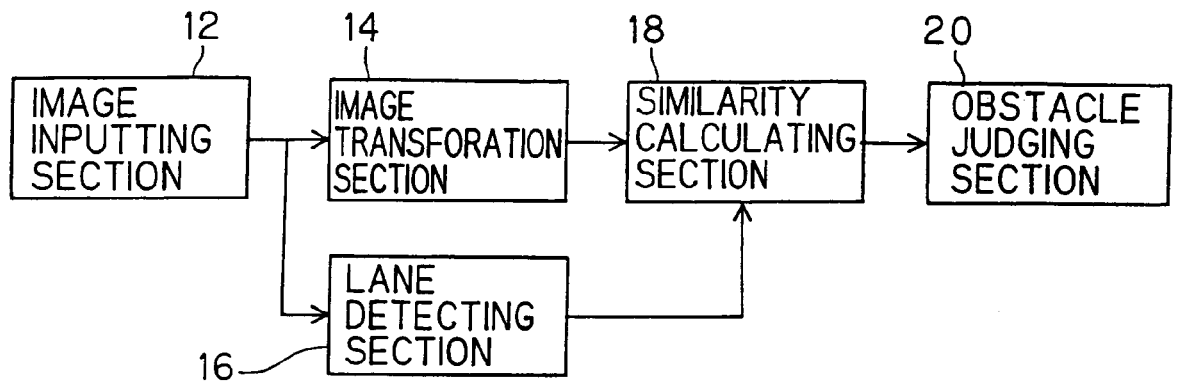
FIG. 1 is a block diagram showing a whole arrangement of an example of an obstacle detecting system according to the invention.

FIG. 1 shows a schematic arrangement of an obstacle detecting system 10 in the example, which includes an image capture section 12, an image transforming section 14, a lane detecting section 16, a similarity calculating section 18, and an obstacle judging section 20. In each of the sections, functions as explained below are realized by means of a program stored in a computer.

In the following, details of the sections will be explained.

(Image Capture Section 12)

Figure 2:
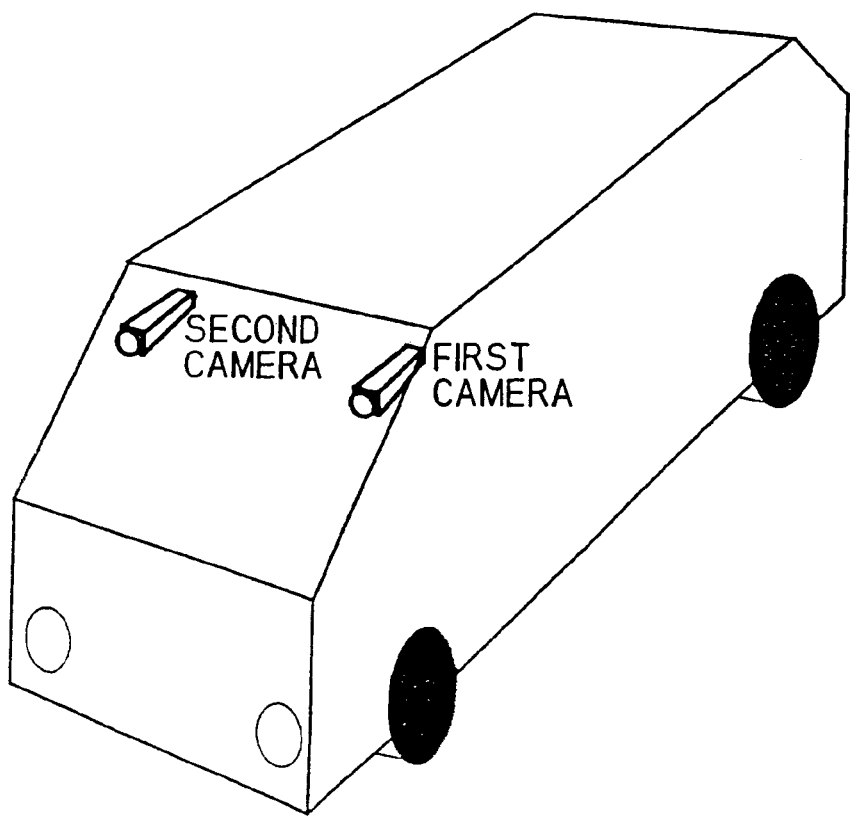
FIG. 2 is a perspective view showing an example of a form of the obstacle detecting system according to the invention mounted on a subject vehicle.

The image capture section 12 functions to input images from two cameras (a stereo camera) secured on a vehicle (see FIG. 2).

As will be explained later, each of images obtained by the two cameras is to be used for obtaining similarity between regions established so as to be in correspondence with each other in the images on the assumption that a plane of the region stands on the road surface. Thus, optical axes of the two cameras are to be aligned in parallel with each other and to have no rotation about the respective optical axes.

The above condition, however, is not necessarily to be satisfied within a range in which correction of the camera image (for example, rotation correction) is possible or within a range in which a deviation from parallel alignment or rotation is negligible as a tolerated error by later described processing.

(Image Transforming Section 14)

The image transforming section 14 carries out transform introduced from a geometrical relationship between the stereo camera and the road surface for transforming a first camera's image to produce a transformed image.

Figure 3:
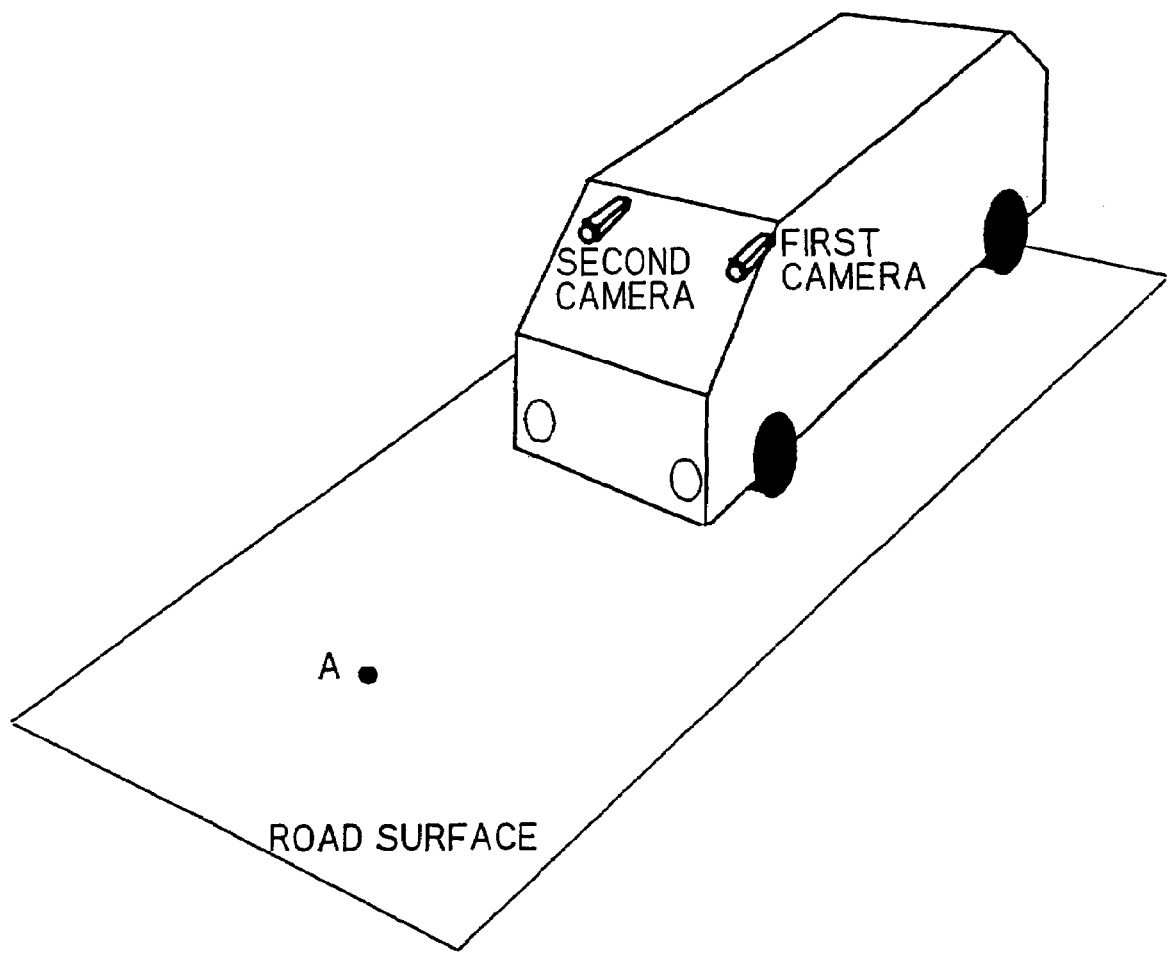
FIG. 3 is an explanatory diagram for explaining image transform.
Figure 3:
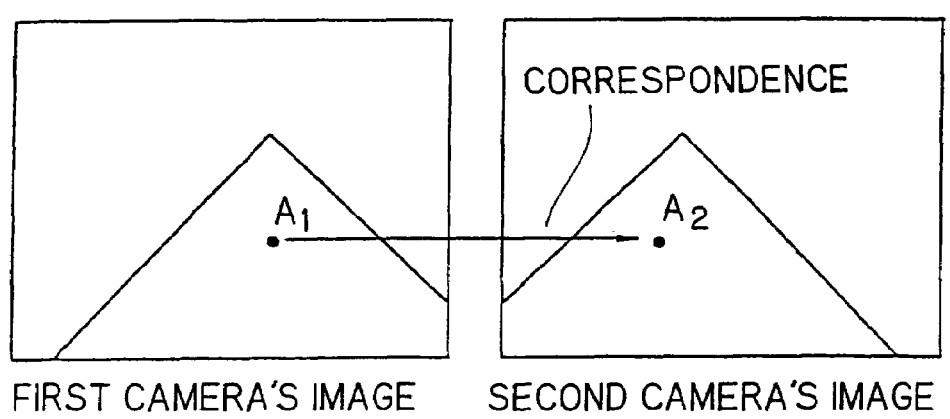

The transform is image transform by which, when any given point A on the road surface is picked up by the first camera and the second camera and presented as a pixel $A_1$ and a pixel $A_2$ with coordinates on images of the first camera and the second camera, respectively, the pixel $A_1$ is brought into correspondence with the pixel $A_2$ (see FIG. 3).

Namely, the image transform becomes one such that an image obtained with a view point of the first camera is transformed into an image obtained with a view point of the second camera. An example of such image transform is explained in detail in the above-described related procedure.

Figure 4:
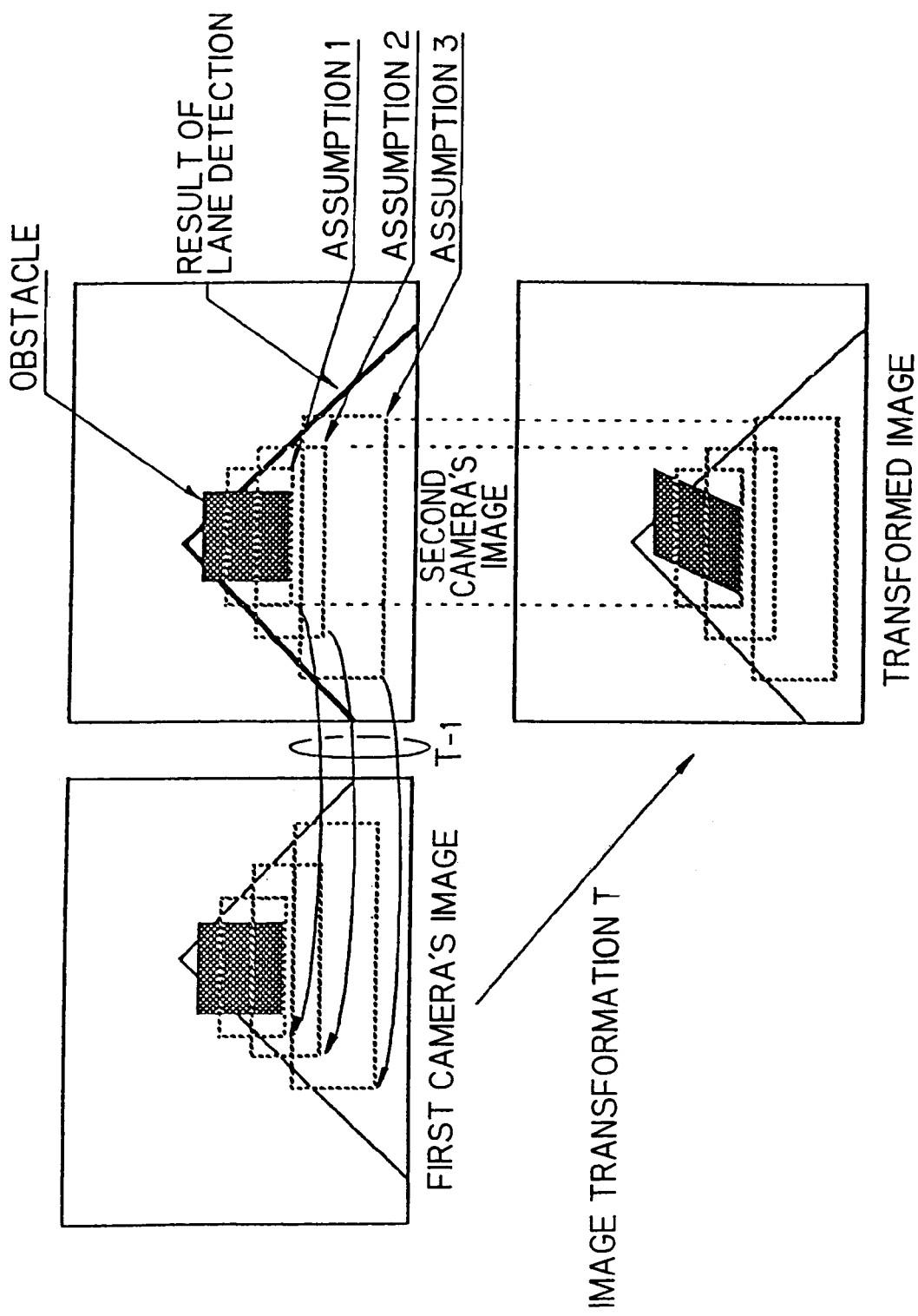
FIG. 4 is an explanatory diagram for explaining the image transform.

In the related method, a picture element of a point on the road surface in the first camera's image is correctly transformed into a picture element at the corresponding point in a second camera's image by the image transform T. Compared with this, for an object with a height in a space, a point at some height from the road surface is subjected to the image transform for a point on the road surface. This produces some difference between a point in the first camera's image and a corresponding point in the second camera's image, by which the object with a height is transformed with a distortion, resulting in a shape as though the object is made inclined in the transformed image. By utilizing this, difference between the second camera's image and the transformed image of the first camera's image is calculated to detect the difference caused by the detection for finding the obstacle (see FIG. 4).

Here, an explanation will be made about the image transform T.

In general, it is possible to carry out a geometrical transform so that a position on the road surface in the image obtained by the first camera (a projected position in the image) is brought to a position equal to the position on the road surface in the image obtained by the second camera (the reference image).

For example, suppose that camera parameters $p_{11}$ to $p_{34}$ of the second camera can be expressed by a 4×3 matrix given by the following equation. Here, (X, Y, Z) represent coordinates in a space and $(x_2, y_2)$ represent coordinates in the image obtained by the second camera in correspondence with the coordinates in the space:

$$\begin{bmatrix} x_2 \\ y_2 \\ 1 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} X \\ Y \\ Z \\ 1 \end{bmatrix}. \quad (1)$$

In the same way, camera parameters $q_{11}$ to $q_{34}$ of the first camera can be also expressed by a 4×3 matrix with coordinates in the image obtained by the first camera represented by $(x_1, y_1)$:

$$\begin{bmatrix} x_1 \\ y_1 \\ 1 \end{bmatrix} = \begin{bmatrix} q_{11} & q_{12} & q_{13} & q_{14} \\ q_{21} & q_{22} & q_{23} & q_{24} \\ q_{31} & q_{32} & q_{33} & q_{34} \end{bmatrix} \begin{bmatrix} X \\ Y \\ Z \\ 1 \end{bmatrix}. \quad (2)$$

At this time, a constraint for a point on the road surface is given by the following equation with a, b, c, and d taken as parameters:

$$[a \ b \ c \ d] \begin{bmatrix} X \\ Y \\ Z \\ 1 \end{bmatrix} = 0. \quad (3)$$

By simultaneously solving the equations (1), (2), and (3), with $r_{11}$ to $r_{33}$ taken as parameters, the following relationship can be obtained for transforming $(x_2, y_2)$ to $(x_2, y_2)$ as, $$\begin{bmatrix} x_2 \\ y_2 \\ 1 \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} x_1 \\ y_1 \\ 1 \end{bmatrix}. \quad (4)$$

The equation is the image transform T, which shows that any point on the road surface can be transformed from a position in the first camera's image to a position in the second camera's image by the equation (4). Conversely, a point not on the road plain does not satisfy the relationship given by the equation 4. Therefore, it is shown that such a point is not transformed on the same position as that in the second camera's image by the transform by the equation (4).

It is apparent that the transform parameters become fixed values when the two cameras are fixed. Therefore, the nine values of $r_{11}$ to $r_{33}$ can be stored as the transform parameters.

(Lane Detecting Section 16)

The lane detecting section 16 detects from the second camera's image such a traffic lane region on the road as to include an obstacle.

Such a region includes, for example, a region in a traffic lane ahead the subject vehicle or in a lane adjacent thereto which is found by using a result of edge detection or white line detection obtained by processing such as though transform to the second camera's image.

In detecting a lane, any conventional procedure can be used. When a region on the road surface is detectable, there is no necessity of detecting a lane mark usually clearly indicated by a white line. In the following, however, an explanation will be made on the assumption of a lane which is obtained by detecting a traffic lane for the purpose of simplifying the explanation.

Moreover, when vibration of the subject vehicle or inclination of the road surface is obtained from the result of lane detection in the first camera's image and the image of the camera as in the related procedure for carrying out correction of the image transform T, the result of the lane detection can be of course used.

(Similarity Calculating Section 18)

In the similarity calculating section 18, on the basis of the result of the lane detection obtained in the lane detecting section 16, a plurality of processing regions are virtually established in the lane region (in the image) with the base of each of the processing regions formed by one of a plurality of later described image lines assumed in the lane region as being in parallel with each other. On the assumption that an obstacle with a certain size stands from one of the image line on the road surface, the processing regions are sequentially established from the vicinity of the subject vehicle to the distance in the image. About the processing regions established in the first camera's image, the second camera's image and the transformed image, similarity between the first camera's image and the second camera's image, and similarity between the second camera's image and the transformed image are calculated.

Figure 5:
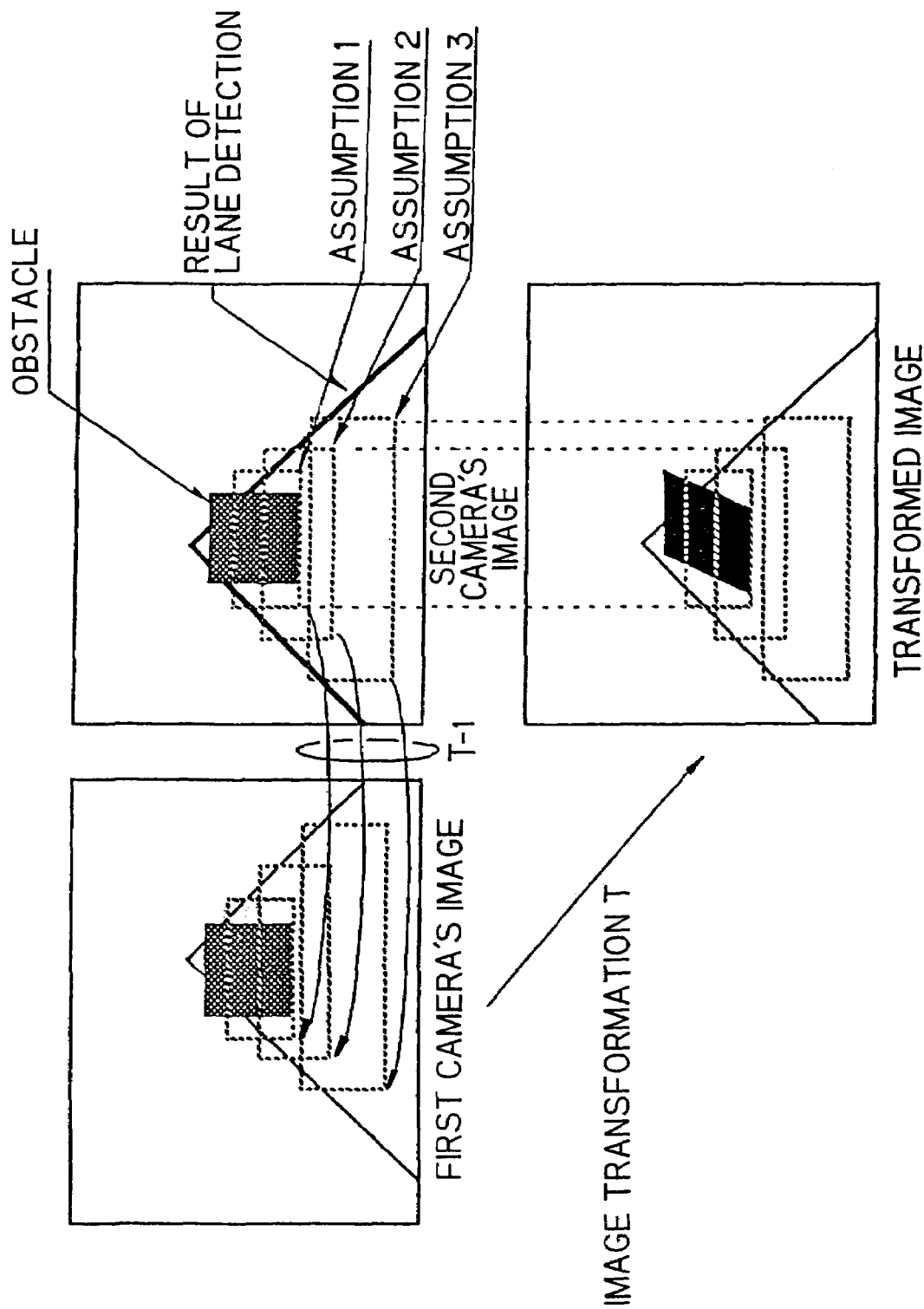
FIG. 5 is an explanatory diagram explaining relationship between an assumed obstacle and a processing region in each kind of image.

An example of establishment of processing regions is shown in FIG. 5. Here, the x-axis direction is referred to as the horizontal direction of an image, and the y-direction is referred to as the vertical direction of the image.

An obstacle is supposed to be approximately ahead the subject vehicle with the surface of the obstacle (namely, the surface picked up as an image) having unevenness being so negligibly small compared with the distance from the cameras to the obstacle as to make the surface regarded as a flat plane standing on the road. At this time, in the lane region, a line is assumed as being in parallel with the contact line as the line of intersection between the obstacle surface and the road surface. The line is to be referred as an image line. Here, a rectangular processing region is established with the base thereof formed by the image line. By assuming a plurality of the image lines in parallel with one another (here, made also in parallel with the x-axis) in the lane region in the vertical direction of the image, the processing region is sequentially established on each of the image lines from the vicinity of the subject vehicle to the distance in the second camera's image. The size of the processing region is determined from the width of the contact line (becomes the width of the lane in the x direction in the image) and y coordinates in the image corresponding to the distance from the subject vehicle to the distant.

The image line is not necessarily to be in parallel with the x-axis but may be inclined to it on condition that the image line represents the contact line of the obstacle plane with the road at any position in the lane.

The position and the width of the processing region within the lane are determined by a width of the lane and a value of the y coordinate corresponding to the distance from the subject vehicle in the second camera's image. Moreover, a height of the processing region is determined by the value of the y coordinate. Both are expressed as a function of the width of the lane or the value of the y coordinate and become smaller with an increase in distance from the subject vehicle, that is, as the lane width in the image becomes smaller and y coordinate becomes larger. The function is appropriately determined on the basis of a range of the size of the obstacle to be detected.

In the next, a processing region in the first camera's image and processing region in the transformed image are established, both corresponding to the processing region in the second camera's image.

The corresponding processing region in the first camera's image is made to be a region having a base with a size equal to that of one to which the base of the processing region in the second camera's image is transformed by inverse transform $T^{-1}$ of the transform T used for the image transform.

Here, the inverse transform $T^{-1}$ become a transform which cancels difference produced on the assumed contact line (namely, the image line as the base of the processing region) due to parallax caused by the stereo camera. The processing region in the transformed image is provided as a region with coordinates in the image being the same as those of the processing region in the second camera's image.

With respect to thus established processing regions, degrees of similarity are to be calculated about an obstacle and a pattern on the road surface between the first camera's image and the second camera's image, and the second camera's image and the transformed image. For the degree of similarity, it is possible to use normalized cross correlation, SAD (Sum of Absolute Difference), or SSD (Sum of Squared Difference).

(Obstacle Judging Section 20)

In the obstacle judging section 20, degree of similarity between the first camera's image and the second camera's image (referred to as degree of similarity D), and degree of similarity between the second camera's image and the transformed image (referred to as degree of similarity P), which are obtained in the similarity calculating section 18, are used for deriving a value of a difference K between the similarity as $$K=\text{Degree of similarity } D-\text{Degree of similarity } P \quad (5)$$

from the value of which the obstacle is detected.

SPECIFIC EXAMPLES

In the following, several typical conditions of the road surface are considered, in each of which an explanation will be made how an obstacle is detected by using the expression (5).

Here, the following four road surface conditions are considered in each of which there is an obstacle in a road region on a road surface ahead.

Figure 6:
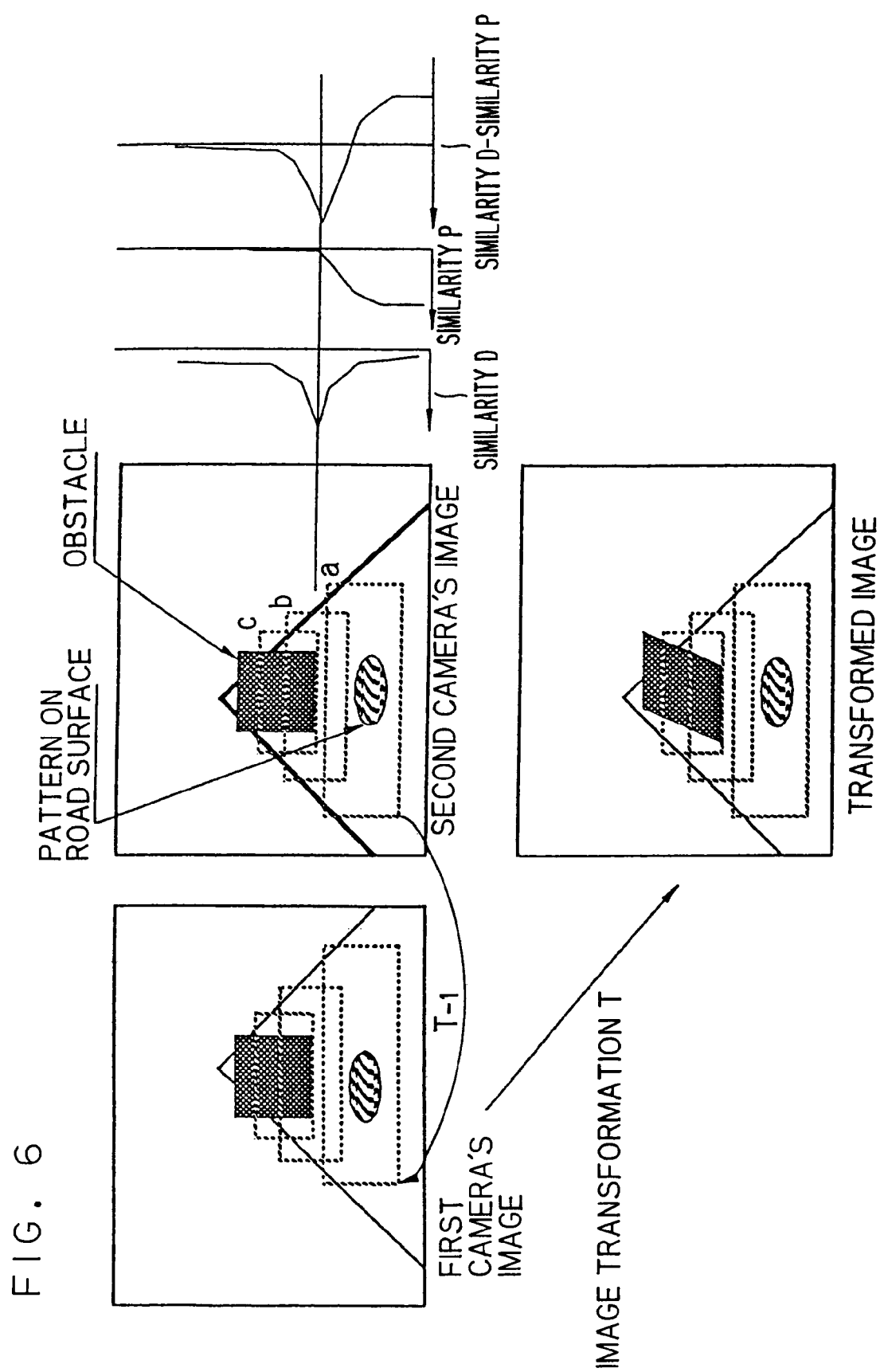
FIG. 6 is an explanatory diagram showing each kind of image under a first road surface condition under which a distinguished two-dimensional pattern is found on a road surface.

First road surface condition . . . the case in which there is a pattern appearing in the image as a two-dimensional pattern as a road marking such as "STOP" or that indicating a speed limit (see FIG. 6).

Figure 7:
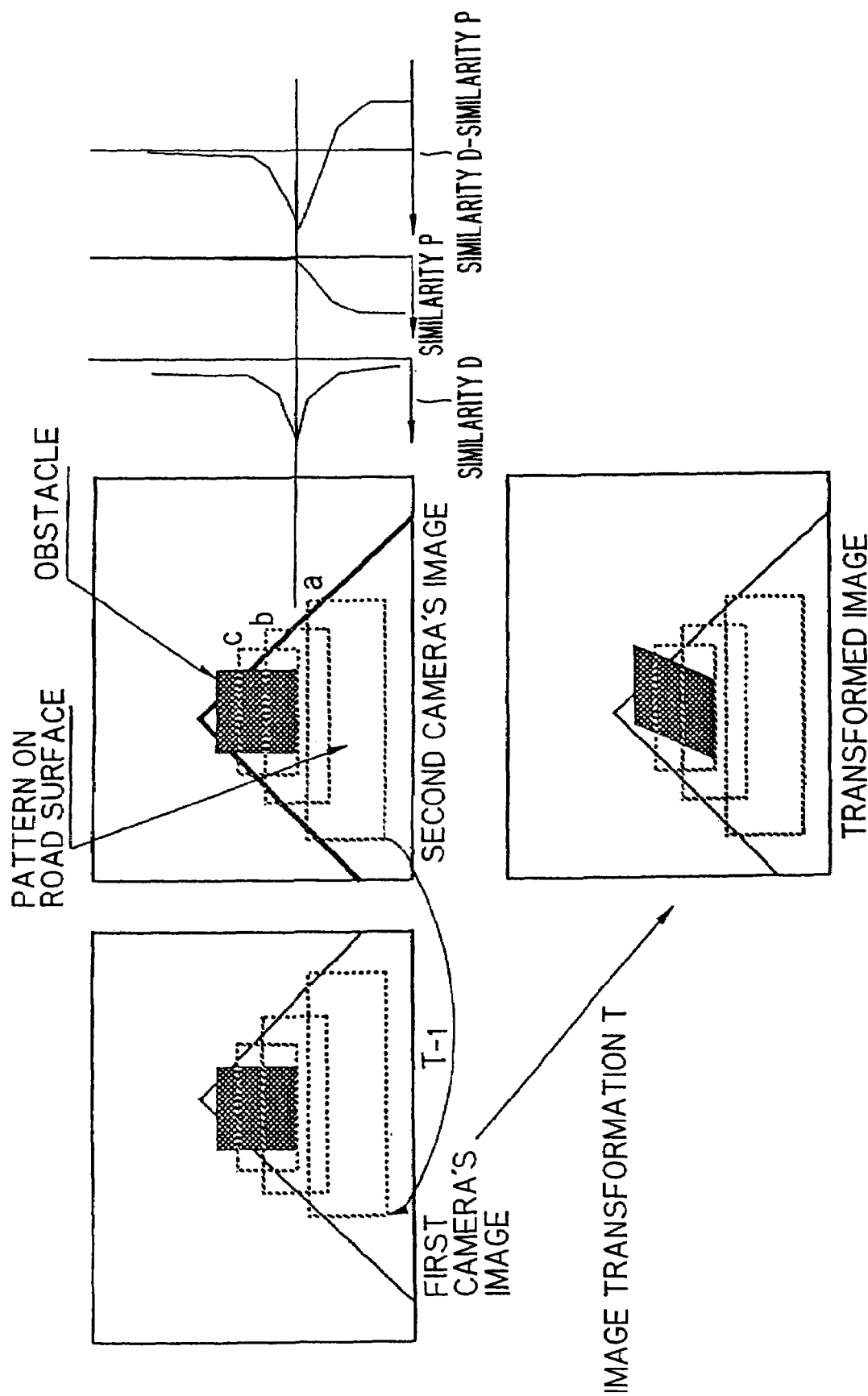
FIG. 7 is an explanatory diagram showing each kind of image under a second road surface condition under which no distinguishing pattern is found on a road surface.

Second road surface condition . . . the case in which there is hardly observable pattern on the road surface (see FIG. 7).

Figure 8:
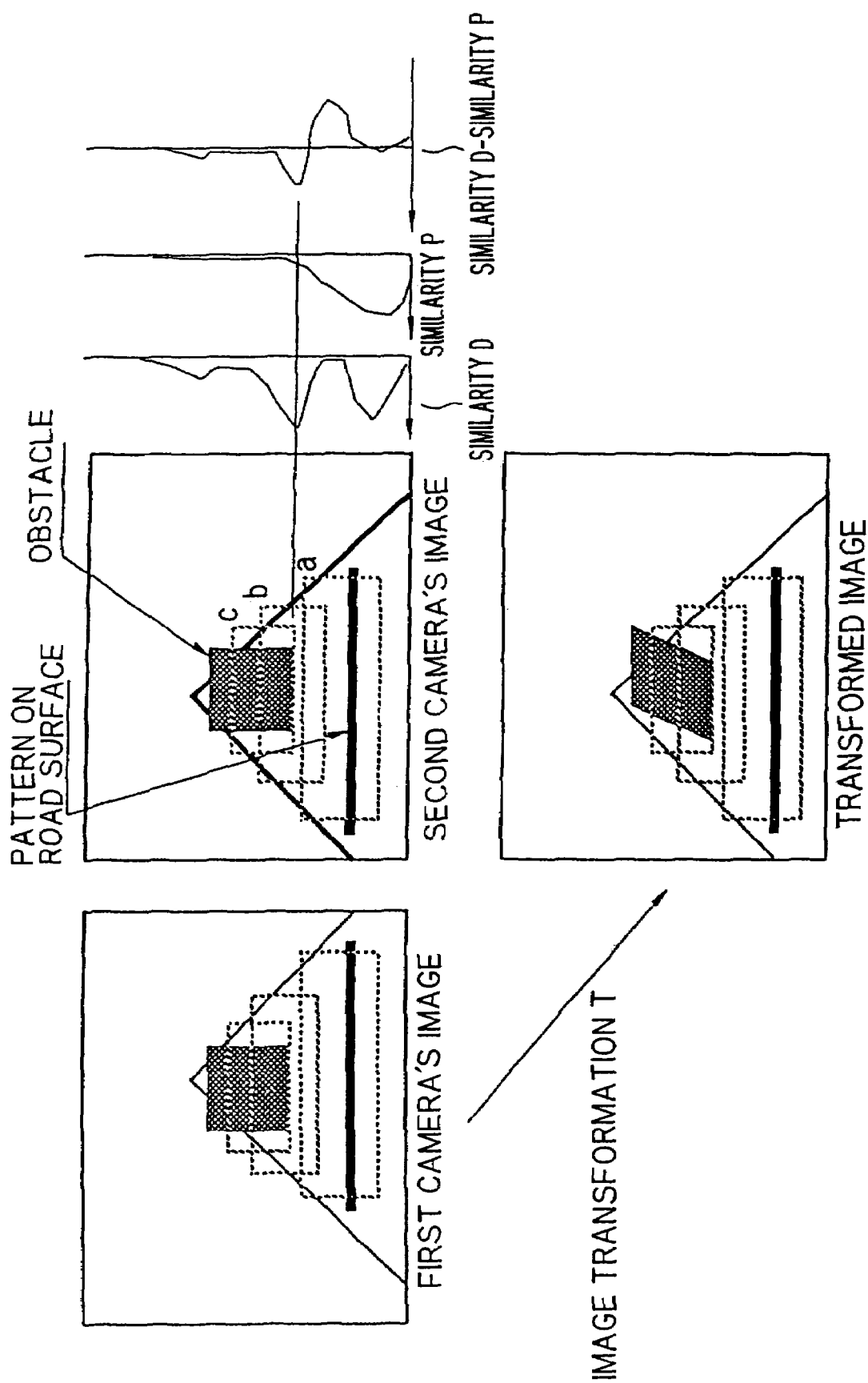
FIG. 8 is an explanatory diagram showing each kind of image under a third road surface condition under which a distinguished one-dimensional pattern is found on a road surface.

Third road surface condition . . . the case in which there is a distinguished one-dimensional pattern on the road surface due to a stop line, a joint line of the road surface, or a shadow of a sidewall of the road or a surrounding structure (see FIG. 8).

Fourth road surface condition . . . the case in which there is a reflected image on the road given as a virtual image of an obstacle or a surrounding structure under a wet road condition in rainy weather (see FIG. 9).

In the following, explanations will be given in that the degree of similarity takes a value from 0 to 1, a higher one of which is to represent higher similarity. Moreover, in order to simplify the explanation as explained before, the degree of similarity between the first camera's image and the second camera's image is to be referred to as a degree of similarity D, and the degree of similarity between the transformed image and the second camera's image is to be referred to as a degree of similarity P.

(1) First Road Surface Condition

First, an explanation will be made about the case in which there is a texture appeared in a two-dimensional pattern in the image such as a marking of "STOP" or an indication of speed limit, or a cover of a manhole as shown in FIG. 6.

Rectangles shown by broken lines in each of the images in FIG. 6 represent typical examples of processing regions established in the second camera's image and respective corresponding processing regions in each of the first camera's image and the transformed image.

Example of results of calculations of a degree of similarity D(y) between respective corresponding processing regions in the first camera's image and the second camera's image, a degree of similarity P(y) between respective corresponding processing regions in the second camera's image and the transformed image, and difference of the degree of similarity D(y)–the degree of similarity P(y), each being a function of y, are shown on the right side of the figure.

In the results, each axis of ordinates represents corresponding y coordinate (coordinate in the vertical direction of the image) in the second camera's image and each axis of abscissas represents the degree of similarity P(y) or D(y), or difference between degrees of similarity P(y)–D(y).

When there is a distinguished two-dimensional texture on the road surface in the processing region (the processing region "a" in the figure), since the base of the processing region (namely, an image line as a contact line of an obstacle assumed there with the road surface) is transformed so that a difference due to a parallax caused by the stereo camera is canceled, the degree of similarity D(y) has a high value only at the base of the processing region and for a pattern as a plane standing from the base in the processing region. The other parts in the processing region, however, do not satisfy the condition of standing from the base (namely, the condition of being a plane standing from the base). Thus, the texture in the processing region in the first camera's image does not match the texture in the processing region in the second camera's image in most of parts to cause the degree of similarity D(y) to have a low value about the processing region "a".

Meanwhile, about the degree of similarity P(y), since a picture element on the road surface in the first camera's image is correctly transformed in the transformed image into a picture element corresponding to that in the second camera's image, a pattern in the processing region in the second camera's image matches that in the transformed image to make P(y) have a high value about the processing region a.

The processing region in each image is thereafter changed by sequentially shifting the position of the image line along the y-axis. When the base of the processing region coincides with a contact line of an obstacle in the image (the processing region "c" in the figure), the image of the obstacle comes to stand from the base of the processing region both in the first camera's image and the second camera's image to make the plane of the obstacle coincide with the plane of the processing region, by which the pattern in the processing region in the first camera's image matches that in the second camera's image. This makes D(y) have a high value about the processing region "c". While, in the transformed image, the pattern of the obstacle is transformed into a distorted pattern by image transform, which makes the degree of similarity P(y) have a low value about the processing region c.

In the above intermediate processing regions (the processing regions "c"), the values of the degrees of similarity, although the values depend on the characteristics of the degrees of similarity being used, are provide as being intermediate values in the case of using, for example, the normalized cross correlation, which are presented as shown in graphs in the figure.

Therefore, under the road surface condition as presented here, an obstacle can be detected by carrying out an analysis for peak searching about the degree of similarity D(y). Similarly, the detection is also possible by using the expression (5)

(2) Second Road Surface Condition

Next, an explanation will be made about the case in which there is hardly observable pattern on the road surface as shown in FIG. 7.

Here, when the base of the processing region approximately coincides with a contact line of an obstacle in the image to make the plane of the processing region coincide with the plane of the obstacle (the processing region "c" in the figure), there is found no difference from the case under the first road surface condition. That is, the above is the same for any road surface condition. Therefore, about the second road surface condition to the fourth road surface condition, explanations will be made in being limited to the case in which the object processing region includes an image of the road surface.

Under the second road surface condition, the degree of similarity P(y) has high values as in the case under the first road surface condition.

The degree of similarity is made differed depending on measurement being used. For example, in the normalized cross correlation, a uniform texture with few characteristics such as the road surface is treated as a cross correlation function of signals with approximately no correlation to provide low values. Moreover, measurement without normalization such as in SAD or SSD are provided with enhanced degrees of similarity (namely, with lowered values of SAD or SSD) when respective optical systems of the first camera and the second camera are provided with approximately the same optical characteristics.

Therefore, unlike the case under the first road condition, some measurement being used make it impossible to detect an obstacle only by the degree of similarity D(y). However, the degree of similarity P(y) is provided with high values and the difference K(y) in the expression (5) is to have negative or low positive values. Therefore, an analysis of the expression (5) about a search for the peak position makes it possible to correctly detect the obstacle.

(3) Third Road Surface Condition

Following this, an explanation will be made about the case in which there is a distinguished one-dimensional texture on the road surface due to a stop line, a joint line of the road, or a shadow of a surrounding structure of the road as shown in FIG. 8.

When there is such a distinguished texture in the processing region (the region "a" in the figure), a "deviation" is to be caused due to parallax accompanied with stereoscopic viewing in the respective processing regions in the first camera's image and the second camera's image. The "deviation", however, is not reflected to the degrees of similarity because of the texture being one-dimensional.

Therefore, although the processing region does not satisfies the condition that the base of the processing region coincides with a contact line of an obstacle in the image, an enhanced degree of similarity is provided. This sometimes makes it impossible to correctly detect the obstacle only by the degree of similarity D(y).

However, regardless of whether the texture on the road surface is one-dimensional or two-dimensional, the texture on the road surface in the first camera's image matches a corresponding picture element in the second camera's image, which makes the degree of similarity P(y) has high values. Therefore, like in the cases under the first and second road conditions, the difference K of the expression (5) is provided as a low value at a position other than the position of the obstacle to make it possible to detect the obstacle by carrying out analysis for searching the peak position about the expression (5).

(4) Fourth Road Surface Condition

An explanation will be made about the case in which there is a reflected image on a road surface given as a virtual image of an obstacle or a surrounding structure as shown in FIG. 9.

The road surface assumed as a mirror surface produces a texture of the reflected image as an object with an apparently negative height at the position of the obstacle in each of the images. In the respective images of the first camera and the second camera, the textures of the object are provided with "deviation" from each other in the processing regions due to parallax caused by the stereoscopic viewing to make the degree of similarity D(y) have low values. Meanwhile, in the transformed image, like an object with a height, the reflected image is transformed with distortion. This makes the degree of similarity P(y) also has small values.

In general, a wet road surface as in rainy weather is picked up as an image in which a texture on the road surface includes specular reflection components of an obstacle and surrounding environment by water film.

A little amount of specular reflection component results in a road surface condition near the first or the second road surface condition, while a large amount of specular reflection component results in a road surface condition near the case in which the above-described pure specular reflection is caused. In both cases, both of the degree of similarity D(y) and the degree of similarity P(y) have values close to each other. Therefore, the expression (5) is applied to the degree of similarity D(y) and the degree of similarity P(y) for carrying out an analysis of peak searching, by which the position of the obstacle can be detected.

(5) SUMMARY

In summary, it becomes possible to detect an obstacle ahead the subject vehicle by carrying out analyses for obtaining peak positions of differences K given by the expression (5) under all of the first to the fourth road surface conditions.

However, when no object lies ahead, there is a problem in taking the peak position of the difference K given by the expression (5) as an obstacle position in the image. Therefore, threshold processing is carried out in which a certain threshold value is provided beforehand for the difference K as the result given by the expression (5) for searching a peak position only about the results equal to or above the threshold value to output the obtained peak position as the obstacle position in the image.

The position of the obstacle obtained at the obstacle judging section 20 is translated into information of an actual distance on the basis of characteristics of cameras being used. The information is then used as control information for a warning device or a vehicle.

Example of Variation 1

In the following, examples of variations will be explained.

As an example of variation 1, at the similarity calculating section 18, one or more scaled images each with different scale (multi-scale images) may be provided about each of the first camera's image, the second camera's image, and the transformed image. Among the provided scaled images, about each of the first camera's image, the second camera's image, and the transformed image, on the basis of a height, a width, or an area (the number of picture elements) of a processing region in the original image, there is selected an image with such a scale that the degrees of similarity can be still correctly obtained with reduced amount of arithmetic operations. In this way, the degree of similarity D(y) and the degree of similarity P(y) may be calculated about between corresponding processing regions in the scaled images for being outputted.

When an obstacle is supposed to be close to the subject vehicle (in a lower portion in the image), a processing region becomes large to increase amount of arithmetic operation. Thus, the processing with multi-scale images is particularly effective when the obstacle detecting system 10 being used has a low operation capacity, or when operation cost of measurement used as degrees of similarity is expensive.

Example of Variation 2

In the obstacle judging section 20 in the above example, threshold processing was carried out about the difference K as a result given by the expression (5) to determine the position of an obstacle. As shown in FIG. 6 to FIG. 9, the difference K as the result given by the expression. (5) is broadened around a peak centered at the position of the obstacle.

Therefore, letting the difference K processed by the threshold value processing with a threshold value equal to or more than zero be given as $K_{th}(y)$ as a function of position y in the vertical direction of the image, it may be judged that there is none of the obstacle in a case when $$\sum_y K_{th}(y) = 0$$

is satisfied, and it may be judged that $y_0$ that makes $$\left| \alpha \sum_y K_{th}(y) - \sum_y^{y_0} K_{th}(y) \right|$$

the minimum is the position of the obstacle in the cases other than the above, where a is any one of constants from 0 to 1.

Example of Variation 3

In the similarity calculating section 18 in the above-described example, the degree of similarity D(y) and the degree of similarity P(y) were obtained about processing regions established in the images.

However, a region including the already established processing region and a region surrounding thereof may be established as a new processing region in each of the second camera's image, and the first camera's image or the transformed region. With each new processing region being shifted, a degree of similarity becoming maximum is obtained. Thus obtained maximum value may be outputted as the degree of similarity D(y) or P(y).

Such processing is particularly effective in the case in which no correction for the image transform T is given like in the related procedure, and transform error is found in the image transform caused by pitching or rolling of the subject vehicle or inclination of the road.

Example of Variation 4

In the similarity calculating section 18 and the obstacle judging section 20 in the above-described example, a position of an obstacle was detected from a degree of similarity D(y) and a degree of similarity P(y) obtained by establishing one processing region about one value of y coordinate in the second camera's image.

Compared with this, two or more functions may be provided for determining (the position, the width, and the height of) the processing region in the second camera's image to provide a degree of similarity D(y) and a degree of similarity P(y) about each processing region established by each of the functions. The position of the obstacle may be thereafter obtained by carrying out the processing about each of the functions in the obstacle judging section 20 in the above-described example.

At this time, an output maybe provided as either a position of an obstacle selected as being closest to the subject vehicle or positions of a plurality of obstacles. Either is to be selected depending on the form of the obstacle detecting system 10 using the information of position.

Example of Variation 5

In the similarity calculating section 18, a processing region was first established in the second camera's image before processing regions were established in the first camera's image and the transformed image each with the same size as that of the processing region in the second camera's image.

Compared with this, the degree of similarity D(y) and the degree of similarity P(y) may be obtained by establishing two processing regions sharing an assumed contact line of the obstacle with sizes different from each other before corresponding processing regions are established in the first camera's image and the transformed image.

Example of Variation 6

In the similarity calculating section 18, all of the processing regions used in calculating degrees of simulation were formed in a rectangle.

Compared with this, any shape may be selected for the processing regions on condition that all of the first camera's image, the second camera's image, and the transformed image have processing regions with the same shape. Change in the form of the processing region does not bring about any change in the essence of the invention.

Example of Variation 7

With respect to the invention, examples were explained as using two cameras. The position of the obstacle, however, may be obtained by mounting on the subject vehicle a third camera satisfying the same conditions as those for the stereo camera (parallel optical axes, without rotation) and by carrying out processing for the camera 3 and the second camera in the same way as that carried out for the processing for the first camera and the second camera.

At this time, two obstacle positions are to be obtained. Thus, depending on the condition of the obstacle detecting system 10 being used, information about either the position of the obstacle close to the subject vehicle or the two positions is outputted as control information.

Example of Variation 8

The example of the system was described about detection of an obstacle on a road surface with a vehicle-mounted stereo camera. The system, however, can be applied to a traffic control system in which a stereo camera is fixed to a structure installed on the ground for detecting vehicles and pedestrians on a road surface, or to measurement of a position of an object on a surface of a working table (a reference plane) in factory automation.

As described above, according to the invention, images are picked up by a stereo camera and a transformed image is provided by such transform that picture elements in road regions in the respective picked up images are made brought into correspondence. The picked up images and the transformed image are used for obtaining a degree of similarity between corresponding regions in the respective picked up images and a degree of similarity between corresponding regions in one of the picked up images and the transformed image. By carrying out analysis about the difference in the above two similarities, an obstacle on a road surface can be detected without being affected by various textures on a road surface and virtual image due to reflection from a wet road surface in rainy weather.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A computer readable storage medium storing instructions of a computer program which when executed by a computer results in performance of steps comprising:
    inputting a first image and a second image from two cameras, respectively;
    transforming the first image to a transformed image on a basis of image transform which is introduced from a geometrical relationship between a reference plane on which an obstacle is positioned in a field of view common to the two cameras, and the two cameras for transforming any given pixel in a reference plane region in the first image to a corresponding pixel in the second image;
    obtaining a degree of similarity D indicating a similarity between an image in a processing region established in the second image and an image in a corresponding processing region established in the first image and being a function of position in the vertical direction of the image;
    establishing, when any given image line in a specified region in the second image is a contact line of the obstacle with the reference plane, the processing region for an inter-image arithmetic operation between the first image and the second image, and a plurality of the processing regions being established with the image line being shifted in the vertical direction;
    obtaining a degree of similarity P indicating a similarity between an image in the processing region established in the second image and an image in a corresponding processing region established in the transformed image and being a function of position in the vertical direction of the image;
    establishing the processing region for an inter-image arithmetic operation between the second image and the transformed image, and a plurality of the processing regions being established with the image line being shifted in the vertical direction;
    detecting the obstacle on a basis of the degree of similarity D and the degree of similarity P on a reference plane region;
    obtaining a difference K between the degree of similarity D and the degree of similarity P both obtained as being on the reference plane region;
    judging that the obstacle is at a position where the difference K is large; and
    determining a width and a height of the processing region on the basis of a position in the vertical direction on the second image.

2. The storage medium as claimed in claim 1, further comprising:
    carrying out threshold value processing of the difference K with a threshold value equal to or more than zero, in which the difference K is given as K(y) as a function of y the direction of which is taken as the vertical direction of the image and a result of the threshold value processing of K(y) is taken as $K_{th}(y)$;
    judging that there is none of the obstacle in a case when $K_{th}(y)$ satisfies $$\sum_y K_{th}(Y) = 0;$$

and
    judging that a $y_0$ that minimizes $$\left| \alpha \sum_y K_{th}(y) - \sum_y^{y_0} K_{th}(y) \right|$$

is the position of the obstacle in the cases other than the above, where α is any one of constants from 0 to 1.

3. The storage medium as claimed in claim 1, further comprising:
    selecting and outputting either a result of detection of a plurality of the obstacles or a position of an obstacle detected as being the closest to three or more cameras, wherein the two cameras are part of the three or more cameras.

* * * * *